United States Patent [19]

Osman

[11] 4,260,987

[45] Apr. 7, 1981

[54] DISPLAY DEVICE

[75] Inventor: Maged A. Osman, Zurich, Switzerland

[73] Assignee: BBC Brown, Boveri & Company, Limited, Baden, Switzerland

[21] Appl. No.: 911,163

[22] Filed: May 31, 1978

[30] Foreign Application Priority Data

Jul. 15, 1977 [CH] Switzerland ........................ 8768/77

[51] Int. Cl.$^2$ ........................... G06F 3/14; G09F 9/32

[52] U.S. Cl. ....................................... 340/756; 340/760

[58] Field of Search ........................ 340/336, 756, 760; 40/125 E; 58/4 A

[56] References Cited

U.S. PATENT DOCUMENTS

| | | | |
|---|---|---|---|
| 3,968,583 | 7/1976 | Allam | 340/336 X |
| 3,971,012 | 7/1976 | Morokawa | 340/324 R |
| 3,991,552 | 11/1976 | Ho et al. | 340/336 X |
| 4,092,638 | 5/1978 | Ripley | 340/336 |

*Primary Examiner*—Harold I. Pitts

*Attorney, Agent, or Firm*—Oblon, Fisher, Spivak, McClelland & Maier

[57] ABSTRACT

A display device for the electro-optical display of Indian numerals, wherein a plurality of display-active regions are disposed in patterns and electrically individually operated in combination, with predetermined display active regions of a pattern representing an individual numeral. In one embodiment, each display pattern for each Indian numeral consists of seven display-active regions disposed in the form of a frame which consists of an upper bar and a lower bar which both extend approximately horizontally, and a total of four side bars of approximately equal length, together with a planar display active region situated in the middle of the frame and whose length is approximately equal to its width, the side bars each have an end extending at least approximately in the direction of the planar display-active region. Other embodiments include an Indian numeric display employing as many as ten display-active regions.

9 Claims, 7 Drawing Figures

DISPLAY DEVICE

BACKGROUND OF THE INVENTION

1. Field of the Invention

This invention relates to a display device and more particularly to a device for the electro-optical display of Indian numerals.

2. Description of the Prior Art

For the electro-optical display of characters, various categories of display systems are known, a differentiation usually being made between active (self-illuminating) and passive (non-self-illuminating) displays.

Light emitting diodes (LED) can be mentioned as an example of active display devices, and liquid crystal displays (LCD) as an example of passive display devices.

For relatively small digital display devices, such as wristwatches, pocket calculators, measuring instruments, and the like, the problem of optically legible representation of digits with the aid of digit images which can change value and place arises both in active and in passive display devices. For this purpose it is known in various types of display devices to achieve the electro-optical display of legible digits with the aid of certain grids or patterns with a multiplicity of luminous regions which can be operated, that is to say selectively activated and deactivated, individually or in groups, for example in accordance with DT-OS No. 2,461,837 with a matrix consisting of at least sixteen punctiform regions in the form of four horizontal lines each with at least three points, or in accordance with GB-PS No. 842,076 with a straight or slightly obliquely displaced rectangular pattern similar to the FIG. 8 and with a frame of six outer bars and a middle bar, which hereinafter will be referred to as a 7-segment pattern.

The last-mentioned seven-segment pattern is at present generally used for numerical display devices of the active or passive kind, that is to say based on light emitting semiconductor diodes or based on liquid crystals, because it represents an optimum compromise in respect to legibility and in respect of the electronic system required for control, even for multiplace displays.

For the mass production of numerical displays with the 7-segment pattern, for example for fully electronic wristwatches with digital display, complete modules or module components with corresponding integrated circuits and micro-processors are available.

The decade system with Arabic numerals is now generally assumed to be universally understandable. Nevertheless, precisely in Arab countries or countries with traditions steeped in Arabic, such as Iran, Pakistan, and some other Asiatic countries, the decade system is frequently used or understood not in terms of Arabic numerals but instead in terms of the so-called Indian numerals.

Numerical displays for representing Indian numerals (in some cases with certain modifications also referred to as "modern Arabic" or "original Arabic" numerals) are available on the market, but with a complex and/or difficutly legible pattern. In DT-OS No. 2,606,946 there is for example described a display device which has a store device for coded signals corresponding to multiplace numerical values and a circuit for converting the coded numerical values into two different groups of character signals, this device permitting display both in "Arabic" and in "modern Arabic" numerals. The normal Arabic numerals are displayed with the previously mentioned seven-part pattern, while for the display of the "modern Arabic" numerals corresponding to Indian numerals an eleven-part pattern and a correspondingly complex conversion are necessary.

The number of display-active parts or segments which can be operated individually in the matrix image or pattern suitable or necessary for the optically legible display of a digit is however important not only because of the different decoding and conversion, but also because of the corresponding number of connection contacts or "pins" of the components. Apart from the immediately understandable complication in the wiring of display elements with an increasing number of contact points, it is a disadvantage that the methods and components technically available for display devices for representing Arabic numerals cannot be used, or can be used only to a substantially reduced extent, for display devices for representing Indian numerals.

SUMMARY OF THE INVENTION

Accordingly, it is the object of this invention to provide a novel active or passive display device for the electro-optical representation of Indian numerals by a multiplicity of display-active regions which are disposed in patterns and can be individually operated electrically in order in each case to represent an individual digit by predetermined display-active regions of a pattern, which device is suitable for the clearly legible display of Indian numerals with seven to ten segment regions. Apart from the formation of the segment regions or a modification of the program of the display microprocessor, the technologies or components existing for Arabic numeral displays with a seven-part pattern are directly utilized with the same number of contacts or with a relatively slight increase of the number of contacts.

According to a first embodiment of the device of the invention this aim is achieved for the display of Indian numerals which in each case consists of a seven part pattern, and wherein the display-active regions forming the pattern are disposed in the form of a frame which consists of an upper one-piece bar and a lower one-piece bar, each of these bars extending approximately horizontally, and of a total of four side bars which are of approximately the same length, together with a planar segment which lies practically in the middle of the frame and whose length is approximately as great as its width, those ends of the side bars which are nearer the planar element extending at least approximately in the direction of the latter.

According to another embodiment of the device according to the invention for displaying Indian numerals each of which consists of a pattern containing eight, nine, or ten parts, the display-active regions forming the pattern are disposed in the form of a frame which comprises an upper and a lower one-piece bar extending approximately horizontally, two one-piece parallel side bars each of which extends between the appertaining ends of the upper and lower bars of the frame, three diagonal partial bars which lie in the lower or left-hand half of the frame, a planar element lying in the right-hand upper quarter of the frame, and at least two bar fragments extending upwards from the frame near the upper corners of the latter.

According to the invention, the display devices may be in the form of active or passive systems. Examples of active display systems for devices according to the invention are the known light emitting diodes with a hybrid structure, that is to say composed of individual diodes, or of monolithic structure, that is to say in the form of a single crystal. Known powder electroluminescent display systems with polycrystalline coatings as well as plasma and fluorescent displays may also be used. It is noted however, that light emitting diodes are generally preferred for use in an active display system according to the invention.

In addition to various types of liquid crystal displays, examples of suitable passive display systems also include electrochemical displays. Liquid crystal display systems including field effect rotary cells and cholesteric liquid crystal displays with or without guest/host effect are preferred for display devices according to the invention, particularly for use in watches and small calculators.

The various systems mentioned are described in detail in the literature (see for example IEEE Transactions on Electron Devices, Vol. ED-20, No. 11, pages 934–938 and also literature cited therein), so that a fuller description is unnecessary. Likewise, no further description of the circuitry employed in the prior art for the selective electrical operation of the display-active regions of devices according to the invention, including decoding and multiplex switching is necessary.

In most of the above-mentioned passive and active display systems of the kind discussed herein, with the noteworthy exception of hybrid LE displays, the display-active regions are formed by two electrodes or electrode layers which are spaced apart from one another in parallel planes and of which at least one is in the form of a front electrode and therefore optically transparent or translucent, while the rear electrode may be either optically permeable or impermeable.

In the regions of mutual covering or overlapping of the two electrodes display-active, electro-optically acting field regions corresponding to the parts of the pattern can be formed, depending on the nature of the material provided between the electrodes. In the case of hybrid LED's the individual diodes may be constructed as the parts of the pattern and operated accordingly.

Since the production of display-active regions with a simple pattern segmentation is known for Arabic numeral displays, and the ability of methods developed for this purpose to be applied either directly or with only slight modification to display devices according to the invention for the clearly legible electro-optical representation of Indian numerals with a seven-, eight-, nine-, or ten-part pattern is one of the advantages of the invention, a detailed explanation in this respect is unnecessary. It will merely be observed that a plurality of identical or similar display patterns and also separately controllable display regions or symbols, for example for decimal points or commas in the form of a point- or comma-shaped area associated with the numeral pattern, or for logic operations, error or memory displays, in the usual manner for multiplace decade displays can be used in the system of Indian numerals similarly to the system with Arabic numerals, and are also suitable as part of display devices according to the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
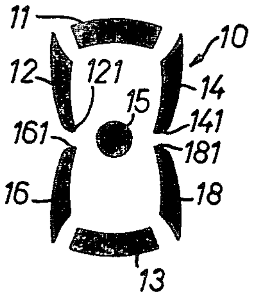
FIG. 1 is a view of the arrangement of the display-active regions of the device in a seven-part pattern.

Referring now to the drawings, wherein like reference numerals designate identical or corresponding parts throughout the several views, and more particularly to FIG. 1 thereof, there is seen the display-active region of a device according to the invention for the display of Indian numerals with a pattern constructed from only seven parts or segments 11, 12, 13, 14, 15, 16, 18 disposed as a frame 10 which is formed by an upper bar 11, a lower bar 13, and four side bars 12, 14, 16, 18. The upper and lower bars 11, 13 respectively extend approximately horizontally, while the side bars extend in their main direction approximately vertically or at an acute angle to the vertical.

The planar segment 15 lies approximately in the middle of the frame 10, and at least those ends 121, 141, 161, 181 of the side bars 12, 14, 16, 18 which adjoin or lie nearer this segment 15 extend approximately in the direction of the segment 15, whose largest cross-section is usually at most twice as great and preferably approximately equally as great as the maximum width of the bars of the frame 10.

In the preferred embodiment shown in FIG. 1 the frame 10 consists of two three-part bar groups 11, 12, 14 and 13, 16, 18 respectively, which are approximately in mirror image symmetry and whose open ends formed by the bar ends 121, 141 and 161, 181 respectively are close to one another, the segment 15 lying approximately in the middle between the two three-part groups of bars.

Figure 2:
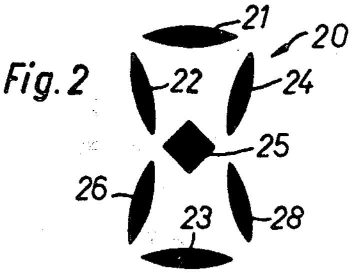
FIG. 2 is a view of a modification of the arrangement shown in FIG. 1.

The planar segment 15 has a length which is approximately as great as its width and, as shown in FIG. 1, may be a circular area or a regular or irregular polygon, for example a rectangle, square, or rhombus, as shown in FIG. 2

In the arrangement shown in FIG. 2 the frame 20 corresponds to a simplified embodiment in which the slight curvature of the side bars which is shown in FIG. 1 is replaced by slight inclination of the side bars 22, 24 and 26, 28 in the direction of the center of the frame 20, while the upper bar 21 and lower bar 22 are roughly rectilinear and not slightly curved as shown in FIG. 1.

Figure 3:
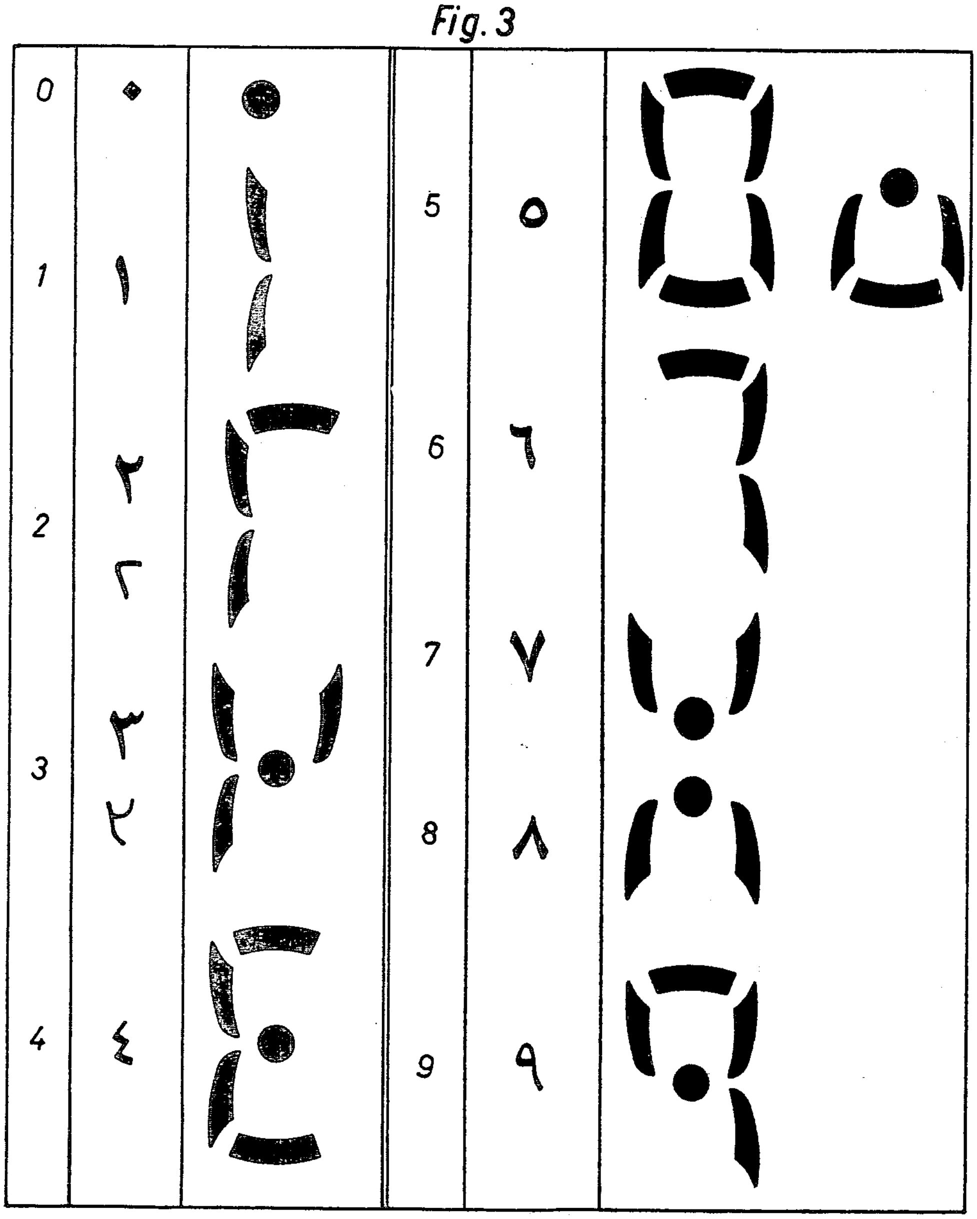
FIG. 3 shows the allocation of the Arabic and Indian numerals with the representation of the individual Indian numerals by means of the display-active regions of the device which are shown in FIG. 1.

FIG. 3 shows in two vertical column groups the Arabic numerals from 0 to 9 with the corresponding Indian numerals and the segment images of the Indian numerals formed with the arrangement shown in FIG. 1. With regard to the Indian numerals shown in the centre column of each group it may be observed that the representation of these numerals in printed or written form may vary, as shown for example for the Indian numerals corresponding to the Arabic numerals 3 and 4.

The segment patterns which can be achieved with the device of the invention through selective operation of one or more display-active regions may also be varied, for example by not activating the segment 15, which is operated additionally to the bars 11, 12, 13, and 16 to represent the Indian numeral corresponding to the Arabic numeral 4, since the corresponding Indian numeral can also be recognized without this segment. In addition, the Indian numeral corresponding to the Arabic numeral 5 may be represented either by operating all the bars 11, 12, 13, 14, 16, 18 of the frame 10 or by operating one three-part horseshoe-shaped bar group 11, 12, 14 or 13, 16, 18 and the planar segment 15.

Figure 4:
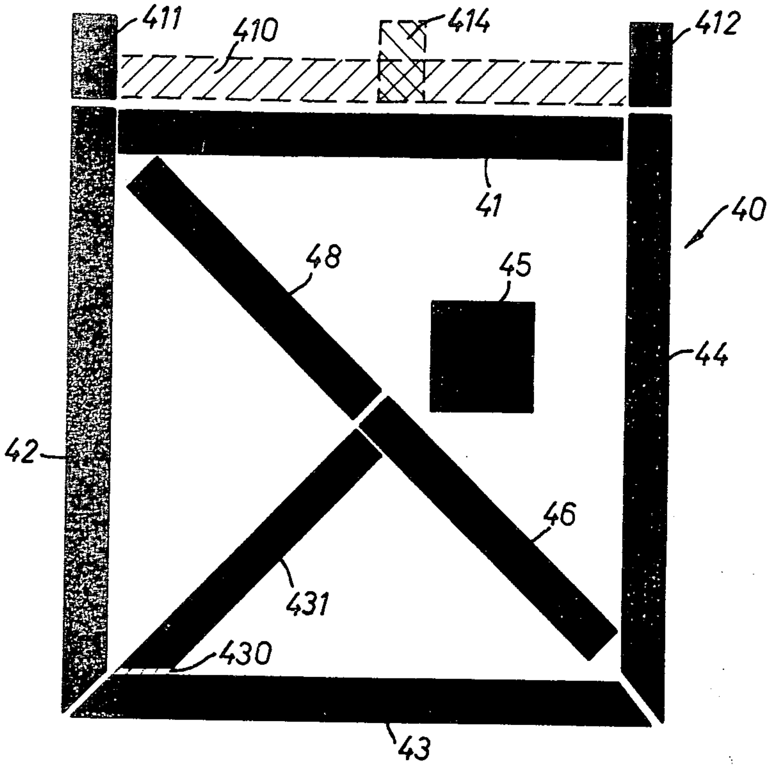
FIG. 4 is a diagram of the arrangement of the display-active regions of the device in a pattern comprising eight, nine, or ten parts.

FIG. 4 shows a diagram of the arrangement of the display-active regions of a second embodiment of the device according to the invention for the clearly legible electro-optical display of Indian numerals in a pattern comprising eight, nine, or ten parts. This pattern is also in the form of a frame 40 which comprises an upper one-piece practically horizontal bar 41, a one-piece lower bar 43 extending practically parallel thereto, two one-piece side bars 42, 44 extending practically vertically between the bars 41 and 43, three partial diagonal bars 46, 48, and 431, a planar element 45, and at least two bar fragments 411 and 412 projecting upwards.

The outer edge bars 41, 42, 43, and 44 may, as shown, circumscribe an area which is approximately square or in the form of a vertical right parallelepiped, which in both cases may be slightly inclined in such a manner that the side bars 42, 44 extending parallel to one another are inclined at an acute angle, that is to say up to about 20°, in the clockwise direction in relation to the vertical. This inclination is advantageous for the representation of the Indian numerals corresponding to the Arabic 7 and 8.

In the lower half of the area thus circumscribed the two partial diagonal bars 431 and 46 lie approximately in the direction of the diagonal of the area, preferably extending approximately over half the total length of the respective diagonals of the area.

The partial diagonal bar 46 lying in the bottom right-hand quarter of the area or frame and the third partial diagonal bar 48 lying in the upper left-hand quarter of the area constitute in each case, like the side bars, a display-active region capable of individual operation, while the bottom bar 43 may be joined to the left-hand bottom partial diagonal bar 431, as indicated by a gap at the transition point 430, in order to form a diaplay-active region which can be operated as a whole, similarly to a reversed horizontal Arabic 1. This combination makes it possible to reduce by one segment unit the display for representing the Indian numerals with the pattern shown in FIG. 4, but has the consequence that the Indian numeral corresponding to the Arabic numeral 5 is shown roughly in half-line size. As will be explained further on, the half-line size of individual numerals written in the Indian manner is not a particularly serious disadvantage even for multiplace display.

All the partial diagonal beams are preferably equal in length, and all the beams, partial beams, and beam fragments have approximately the same width.

The planar element 45 situated in the upper right-hand quarter of the area usually has a width approximately equal to its height and it may be circular or polygonal in shape. Its width is preferably greater than that of the bars, for example about twice as great.

Near the ends of the upper bar there are provided on the upper side of the frame 40 two bar fragments 411, 412 which are approximately equal in size and which project upwards, preferably approximately vertically, from the frame 40, their length usually being not more than about one third of the length of the side bars, while their width is preferably approximately the same as that of all the other bars of the frame.

Between the two bar fragments 411, 412 lying at the edges there may be disposed centrally a third bar fragment 414 of approximately the same shape. If the upper bar 41 forms the upper boundary of the frame 40, two or three bar fragments are display-active regions capable of being operated separately. Since the use of three upwardly projecting bar fragments is preferred for some forms of representation, an upper bar 410 (shown in broken lines) extending over approximately the entire width of the frame 40 may be provided additionally to the bar 41 in order to reduce the number of segments. The distance between the bars 41 and 410 extending approximately parallel is preferably relatively short.

If an additional top bar 410 of this kind is used, it is generally combined with the two outer bar fragments 411, 412 to form a single display fragment. It may in addition also be combined with the optional central beam fragment 414 in the corresponding manner.

Figure 5:
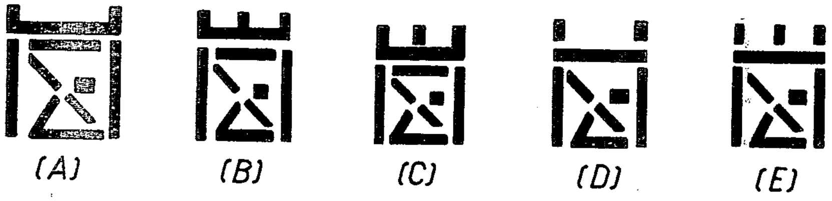
FIGS. 5 and 6 are views of different patterns according to the diagram of FIG. 4.
Figure 6:
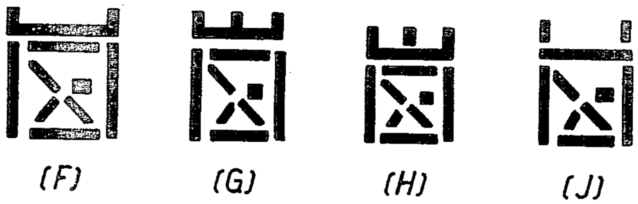

A–E in FIG. 5 and F–J in FIG. 6 are different pattern forms comprising eight to ten parts corresponding to the diagram in FIG. 4, in accordance with the explanations given above.

Figure 7:
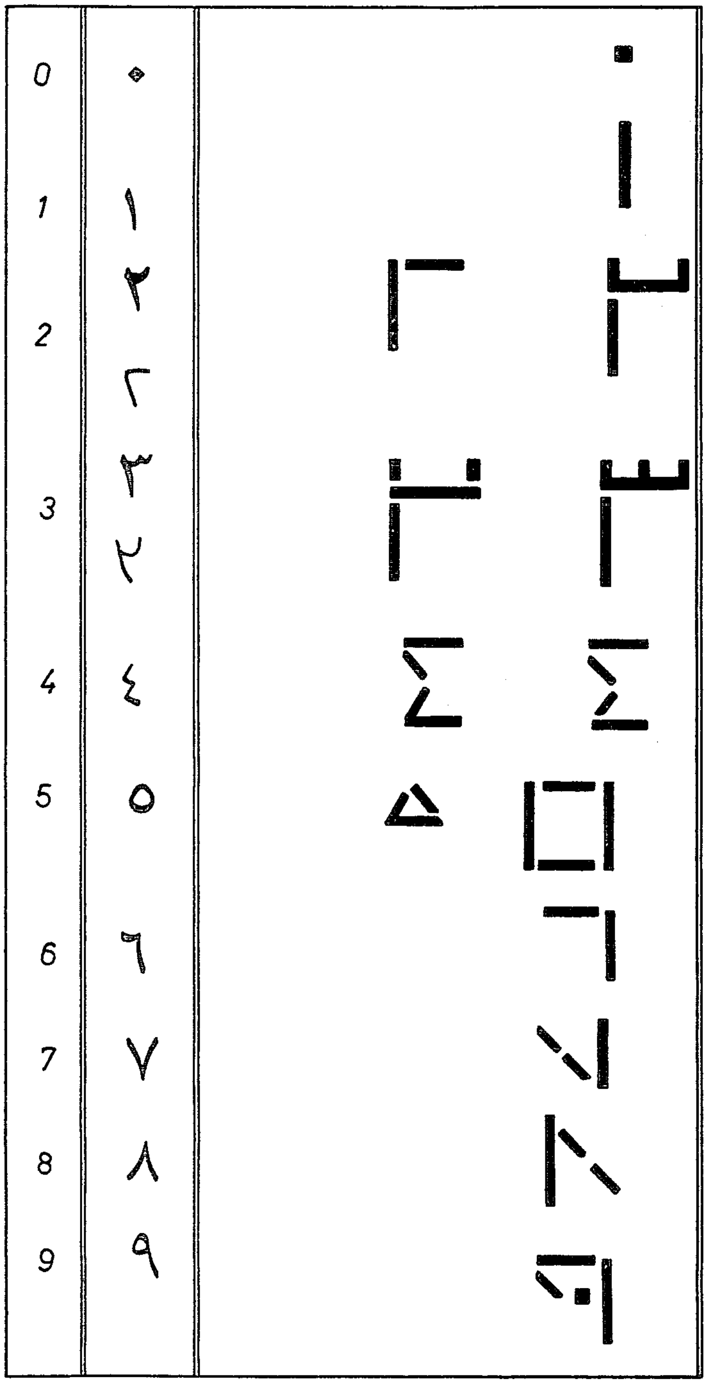
FIG. 7 shows the allocation, similarly to FIG. 3, for the diagram shown in FIG. 4.

Similarly to FIG. 3, FIG. 7 shows a table of the Arabic numerals (first column), the corresponding Indian numerals with the usual variations (second column) and at the side of each numeral the electro-optical display images of the Indian numerals, which can be represented with a total of eight to ten segments with the patterns shown in FIGS. 5 and 6, with some alternative representations.

Practical tests have shown that the Indian numerals which can be represented with the device according to the invention with the aid of a basic pattern comprising only seven to ten segments can be recognized effortlessly and reliably and that the half-line size, which is necessary with the patterns representations of the Indian numerals corresponding to the Arabic numerals 5 or 7 and 8, is not found disturbing. This is possibly due to the fact that the Indian numeral corresponding to the Arabic zero is basically shown relatively smaller and a viewer customary to reading Indian numerals does not in any way expect numeral images of entirely the same height in multiplace numbers.

The effortless recognisability is important and advantageous particularly when the device of the invention is used for digital watches with LC or LED displays since the numeral images then usually have a size (height) of only a few millimeters. For this purpose the ability provided by the invention to apply established methods to the production of numeral display cells with segmented electrode surfaces comprising 7 parts or 8 to 10 parts and with a correspondingly small number of connections is also of particular importance.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a display device for the electro-optical representation of Indian numerals, wherein a plurality of display-active regions are disposed in patterns and are electrically individually operated in combination, with predetermined display-active regions of a pattern representing an individual numeral, the improvement comprising:

each display pattern of each Indian numeral comprising not more than ten display-active regions disposed in the form of a frame which comprises an upper and a lower one-piece bar which extend approximately horizontally, two one-piece parallel side bars which are approximately equal in length and which in each case extend between the appertaining ends of the upper and lower bars of the frame, three partial diagonal bars which lie in the bottom or left-hand half of the frame, a planar display-active region lying in the right-hand upper quarter of the frame, and at least two bar fragments projecting upwards from the frame near the upper corners of the frame.

2. A display device according to claim 1, wherein the partial diagonal bar disposed in the bottom left-hand quarter of the frame is connected to the bottom bar in order together with the latter to form a display-active region integrally operated.

3. A display device according to claim 1, further comprising:

a second upper bar which lies near the upper bar, runs approximately parallel to the latter, and extends practically over the entire width of the frame.

4. A display device according to claim 1, further comprising:

an additional bar fragment which lies approximately in the middle between the bar fragments and has practically the same length as the latter.

5. A display device according to claim 3, wherein the two bar fragments lying near the upper frame corners are joined to the second upper bar in order together with the latter to form a display-active region integrally operated.

6. A display device according to claim 3, wherein the bar fragments are joined to the upper bar in order together with the latter to form a display-active region integrally operated.

7. A display device according to claim 1, wherein the side bars extend approximately perpendicularly to the upper and lower bars.

8. A display device according to claim 1, wherein the side bars are inclined in the clockwise direction by not more than about 20° in relation to the vertical.

9. A display device according to claim 1, further comprising:

a plurality of frames lying side by side for representing multiplace Indian numerals are provided.

* * * * *